United States Patent
Shibata (10) Patent No.: US 10,148,984 B2
(45) Date of Patent: Dec. 4, 2018

(54) TERMINAL DEVICE, SERVER DEVICE, DATA MANAGEMENT SYSTEM, AND RECORDING MEDIUM ON WHICH PROGRAM IS RECORDED

(71) Applicant: Soliton Systems K.K., Tokyo (JP)

(72) Inventor: Yoshiaki Shibata, Tokyo (JP)

(73) Assignee: SOLITON SYSTEMS K.K., Tokyo (JP)

(*) Notice: Subject to any disclaimer, the term of this patent is extended or adjusted under 35 U.S.C. 154(b) by 69 days.

(21) Appl. No.: 14/917,940

(22) PCT Filed: Sep. 3, 2014

(86) PCT No.: PCT/JP2014/073194
§ 371 (c)(1),
(2) Date: Mar. 9, 2016

(87) PCT Pub. No.: WO2015/037494
PCT Pub. Date: Mar. 19, 2015

(65) Prior Publication Data
US 2016/0219310 A1   Jul. 28, 2016

(30) Foreign Application Priority Data
Sep. 12, 2013 (JP) ................................. 2013-189811

(51) Int. Cl.
*H04N 21/2187* (2011.01)
*H04N 21/8352* (2011.01)
(Continued)

(52) U.S. Cl.
CPC ......... *H04N 21/2353* (2013.01); *G06F 21/62* (2013.01); *G06F 21/64* (2013.01);
(Continued)

(58) Field of Classification Search
None
See application file for complete search history.

(56) References Cited

U.S. PATENT DOCUMENTS 6,470,378 B1 * 10/2002 Tracton .................. H04L 29/06
                                                                    709/203
6,799,180 B1    9/2004 McGrath
(Continued)

FOREIGN PATENT DOCUMENTS

JP   2002-082988 A    3/2002
JP   2002-297628 A   10/2002
(Continued)

OTHER PUBLICATIONS

"Unique Material Identifier (UMID)," in SMPTE ST 330:2011, vol., No., pp. 1-26, Aug. 11, 2011.
(Continued)

*Primary Examiner* — Fernando Alcon
(74) *Attorney, Agent, or Firm* — Hidetada James Abe (57) ABSTRACT

Some embodiments may include a transmitting unit which transmits, when one or more pieces of stored data each being an entity at storage of a digital asset are respectively stored in one or more data storage devices, identification data for uniquely identifying the digital asset to a server device; and a receiving unit which receives, from the server device, digital asset use feature information indicating a feature during use of the digital asset uniquely identified by the identification data transmitted by the transmitting unit, and digital asset entity information indicating an entitative feature of each of the one or more pieces of stored data each being an entity at storage of the digital asset uniquely identified by the identification data.

8 Claims, 7 Drawing Sheets

(51) Int. Cl.
    *H04N 21/658* (2011.01)
    *H04N 21/235* (2011.01)
    *H04N 21/231* (2011.01)
    *H04N 21/218* (2011.01)
    *H04L 29/08* (2006.01)
    *G11B 27/32* (2006.01)
    *G06F 21/64* (2013.01)
    *G06F 21/62* (2013.01)

(52) U.S. Cl.
CPC .......... *G11B 27/32* (2013.01); *H04L 67/1097* (2013.01); *H04N 21/2181* (2013.01); *H04N 21/2187* (2013.01); *H04N 21/23116* (2013.01); *H04N 21/6581* (2013.01); *H04N 21/8352* (2013.01)

(56) References Cited

U.S. PATENT DOCUMENTS

| | | | |
|---|---|---|---|
| 6,925,474 | B2 | 8/2005 | McGrath |
| 7,123,814 | B2 | 10/2006 | David |
| 7,149,750 | B2 | 12/2006 | Chadwick |
| 7,246,133 | B2 | 7/2007 | Velasco |
| 7,778,516 | B2 | 8/2010 | David |
| RE41,939 | E | 11/2010 | Harradine |
| 7,873,262 | B2 | 1/2011 | Shibata et al. |
| 8,214,858 | B2 | 7/2012 | Harradine |
| 8,533,507 | B2 | 9/2013 | Vandwalle |
| 9,247,027 | B1 * | 1/2016 | Hare ................ H04L 69/24 |
| 9,615,113 | B2 * | 4/2017 | Kotecha ............ H04N 21/4126 |
| 2004/0088183 | A1 | 5/2004 | Nakanishi et al. |
| 2006/0161604 | A1 | 7/2006 | Lobo |
| 2007/0101352 | A1 * | 5/2007 | Rabina ................ H04H 60/372 725/1 |
| 2007/0156726 | A1 * | 7/2007 | Levy ................... G06F 17/3002 |
| 2010/0050080 | A1 | 2/2010 | Libert et al. |
| 2010/0088311 | A1 | 4/2010 | Du Fosse et al. |
| 2010/0233960 | A1 | 9/2010 | Tucker |

FOREIGN PATENT DOCUMENTS

| | | |
|---|---|---|
| JP | 2002-318803 A | 10/2002 |
| JP | 2009-188436 A | 8/2009 |
| JP | 2009-218866 A | 9/2009 |
| JP | 2010-074596 A | 4/2010 |
| JP | 2011-511368 A | 4/2011 |
| JP | 2012-212208 A | 11/2012 |
| JP | 2012-222769 A | 11/2012 |
| WO | WO 1997-031490 A2 | 8/1997 |
| WO | WO 2001-041401 A2 | 6/2001 |

OTHER PUBLICATIONS

"Application of Unique Material Identifiers in Production and Broadcast Environments," in SMPTE RP 205:2014 , vol., No., pp. 1-44, Dec. 29, 2014.

"EBU / SMPTE Task Force for Harmonized Standards for the Exchange of Programme Material as Bitstreams, Final Report: Analyses and Results," EBU Technical Review Special Supplement 1998, (Aug. 1998).

S. Takeuchi, et al., "A Program Production System Using ID and File-Data Over IP Networks", SMPTE Mot. Imag. J.; Apr. 2005; 114:(4) 132-138.

M. De Geyter, et al., "Integration Demands on MAM Systems: A Proof of Concept Solution," SMPTE Mot. Imag. J.; Nov./Dec. 2008; 117:(8) 38-46.

Y. Shibata, et al., "Introduction to XDCAM Metadata", Proc. NAB 2005 Broadcast Engineering Conference, pp. 421-424 (2005).

Y. Shibata and Jim Wilkinson, "UMID Applications in Practice", SMPTE Mot. Imag. J.; Mar. 2012; 121:(2) 58-67.

Y. Shibata, "Implementation of UMID Resolution based on DNS", ITE Annual Convention 2013, 14-3 (2013) (in Japanese).

Y. Shibata, "Latest Status of UMID Application Project in SMPTE", Proc. SMPTE 2013 Annual Technical Conference (Oct. 2013).

Y. Shibata, "UMID and its Applications", ITE Annual Convention 2012.

WIPO Application No. PCT/JP2014/073194, International Search Report, dated Oct. 14, 2014.

WIPO Application No. PCT/JP2014/073194, Written Opinion of the International Searching Authority, dated Oct. 14, 2014.

WIPO Application No. PCT/JP2014/073194, International Preliminary Report on Patentability, dated Mar. 15, 2016.

EPO Application No. EP3023877, Supplementary European Search Report and European Search Opinion, dated Feb. 8, 2017.

\* cited by examiner

| UNIVERSAL LABEL | LENGTH | INSTANCE NUMBER | MATERIAL NUMBER |
|---|---|---|---|

TERMINAL DEVICE, SERVER DEVICE, DATA MANAGEMENT SYSTEM, AND RECORDING MEDIUM ON WHICH PROGRAM IS RECORDED

CROSS-REFERENCE TO RELATED APPLICATIONS

The present application is a U.S. National Stage of International Application No. PCT/JP2014/073194, filed Sep. 3, 2014, which claims the benefit of Japanese Patent Application No. 2013-189811, filed on Sep. 12, 2013, each of which is incorporated herein by reference in its entirety.

FIELD

The present invention relates to a terminal device, a recording medium with a data processing program recorded thereon, a server device, and a data management system.

BACKGROUND

Conventionally, a technique is disclosed in which, in a media production system or the like, audiovisual (AV) material (hereinafter, referred to as material data) identified by specified identification data that uniquely identifies the material data is read from an optical disc device mounted with a recording medium that stores material data and identification data in association with each other, and the read material data is transmitted to a computer (refer to Patent Document 1).

The technique according to Patent Document 1 involves accessing material data in a recording medium mounted to an optical disc device via an access path corresponding to identification data in order to obtain desired material data from the recording medium and directly providing the computer with the material data.

In addition, a technique is disclosed for associating identification data that uniquely identifies material data with access information for retrieving a site connected to a network in order to enable further additional information related to the material data to be easily retrieved by using the identification data as a key (refer to Patent Document 2).

For example, when the material data is video data capturing a person, the technique according to Patent Document 2 enables the material data to be used more effectively by providing information such as a profile or activity history of the person as the additional information.

CITATION LIST

Patent Literature

Patent Document 1 Japanese Patent No. 3637910
Patent Document 2 Japanese Patent Application Laid-open No. 2002-297628

SUMMARY OF INVENTION

Technical Problem

The present invention has been proposed in order to solve such problems in the conventional art.

Solution to Problem

A first aspect of the present invention includes: a transmitting unit which transmits, when one or more pieces of stored data each being an entity at storage of a digital asset are respectively stored in one or more data storage devices, identification data for uniquely identifying the digital asset to a server device; and a receiving unit which receives, from the server device, digital asset use feature information indicating a feature during use of the digital asset uniquely identified by the identification data transmitted by the transmitting unit, and digital asset entity information indicating an entitative feature of each of the one or more pieces of stored data each being an entity at storage of the digital asset uniquely identified by the identification data.

A second aspect of the present invention is a program for causing a computer to function as the respective units of the terminal device.

A third aspect of the present invention includes: a storage unit which stores, when one or more pieces of stored data each being an entity at storage of a digital asset are respectively stored in one or more data storage devices, identification data for uniquely identifying the digital asset, digital asset use feature information indicating a feature during use of the digital asset uniquely identified by the identification data, and digital asset entity information indicating an entitative feature of each of the one or more pieces of stored data each being an entity at storage of the digital asset uniquely identified by the identification data in association with each other; a receiving unit which receives identification data transmitted by a terminal device; and a transmitting unit which reads out, from the storage unit, digital asset use feature information and digital asset entity information corresponding to the identification data received by the receiving unit, and which transmits the read digital asset use feature information and digital asset entity information to the terminal device.

A fourth aspect of the present invention includes: one or more data storage devices respectively storing one or more pieces of stored data each being an entity at storage of a digital asset; the terminal device; and the server device.

Some embodiments may include a server device, comprising: a storage unit configured to store, when one or more pieces of stored data are respectively stored in one or more data storage devices, identification data for identifying all of the pieces of stored data capable of restoring a unique bitstream, bitstream use feature information which indicates a feature during use of a unique bitstream indicated by the identification data and which includes quality information during use of the bitstream, and stored data entity information which indicates an entitative feature of each of the one or more pieces of stored data capable of restoring the unique bitstream indicated by the identification data and which includes data compression scheme information of the bitstream in association with each other; a receiving unit configured to receive identification data transmitted from a terminal device; and a transmitting unit configured to read out, from the storage unit, bitstream use feature information and stored data entity information of each piece of stored data, both of which correspond to the identification data received by the receiving unit, and transmit the read bitstream use feature information and stored data entity information of each of the one or more pieces of stored data to the terminal device.

Some embodiment may include a server device, comprising: a storage unit configured to store, when one or more pieces of stored data are respectively stored in one or more data storage devices, identification data for identifying all of the pieces of stored data capable of restoring a unique bitstream, bitstream use feature information which indicates a feature during use of a unique bitstream indicated by the identification data and which includes quality information during use of the bitstream, and stored data entity information which indicates an entitative feature of each of the one or more pieces of stored data capable of restoring the unique bitstream indicated by the identification data and which includes data compression scheme information of the bitstream in association with each other; a receiving unit configured to receive identification data transmitted from a terminal device; and a transmitting unit configured to read out, from the storage unit, bitstream use feature information and stored data entity information of each piece of stored data, both of which correspond to the identification data received by the receiving unit, and transmit the read bitstream use feature information and stored data entity information of each of the one or more pieces of stored data to the terminal device.

Some embodiments may include a data management system, including one or more data storage devices, a terminal device, and a server device. The one or more data storage devices are respectively configured to store, in different modes, one or more pieces of stored data each being an entity at storage of a unique bitstream. The terminal device includes: a first transmitting unit configured to transmit, when one or more pieces of stored data each being an entity at storage of the unique bitstream are respectively stored different modes in in the one or more data storage devices, identification data for identifying all of the pieces of stored data capable of restoring the unique bitstream, to a server device; a first receiving unit configured to receive, from the server device, bitstream use feature information indicating a feature during use of the unique bitstream indicated by the identification data transmitted by the first transmitting unit, and stored data entity information indicating an entitative feature of each of the one or more pieces of stored data capable of restoring the unique bitstream indicated by the identification data; and a determining unit configured to, when the bitstream use feature information includes quality information during use of the bitstream, the stored data entity information includes data compression scheme information of the bitstream, and the quality information included in the bitstream use feature information received by the receiving unit is not within a prescribed range, determine that none of the stored data identified by the identification data is to be acquired at a point in time at which the quality information is determined not to be within the prescribed range, and when the quality information received by the receiving unit is within the prescribed range and the data compression scheme information included in the stored data entity information received by the receiving unit matches at least one piece of prescribed data compression scheme information, determine that stored data corresponding to the stored data entity information including the matching prescribed data compression scheme information is to be acquired from the data storage device. The server device includes: a storage unit configured to store, when one or more pieces of stored data are respectively stored in one or more data storage devices, identification data for identifying all of the pieces of stored data capable of restoring a unique bitstream, bitstream use feature information which indicates a feature during use of a unique bitstream indicated by the identification data and which includes quality information during use of the bitstream, and stored data entity information which indicates an entitative feature of each of the one or more pieces of stored data capable of restoring the unique bitstream indicated by the identification data and which includes data compression scheme information of the bitstream in association with each other; a second receiving unit configured to receive identification data transmitted from a terminal device; and a second transmitting unit configured to read out, from the storage unit, bitstream use feature information and stored data entity information of each piece of stored data, both of which correspond to the identification data received by the receiving unit, and transmit the read bitstream use feature information and stored data entity information of each of the one or more pieces of stored data to the terminal device.

Advantageous Effects of Invention

The present invention enables, when one or more pieces of stored data each being an entity at storage of a digital asset are respectively stored in one or more data storage devices, stored data being an entity at storage of a desired digital asset to be readily acquired.

DETAILED DESCRIPTION

Hereinafter, modes for carrying out the present invention will be described in detail.

First Embodiment

Figure 1:
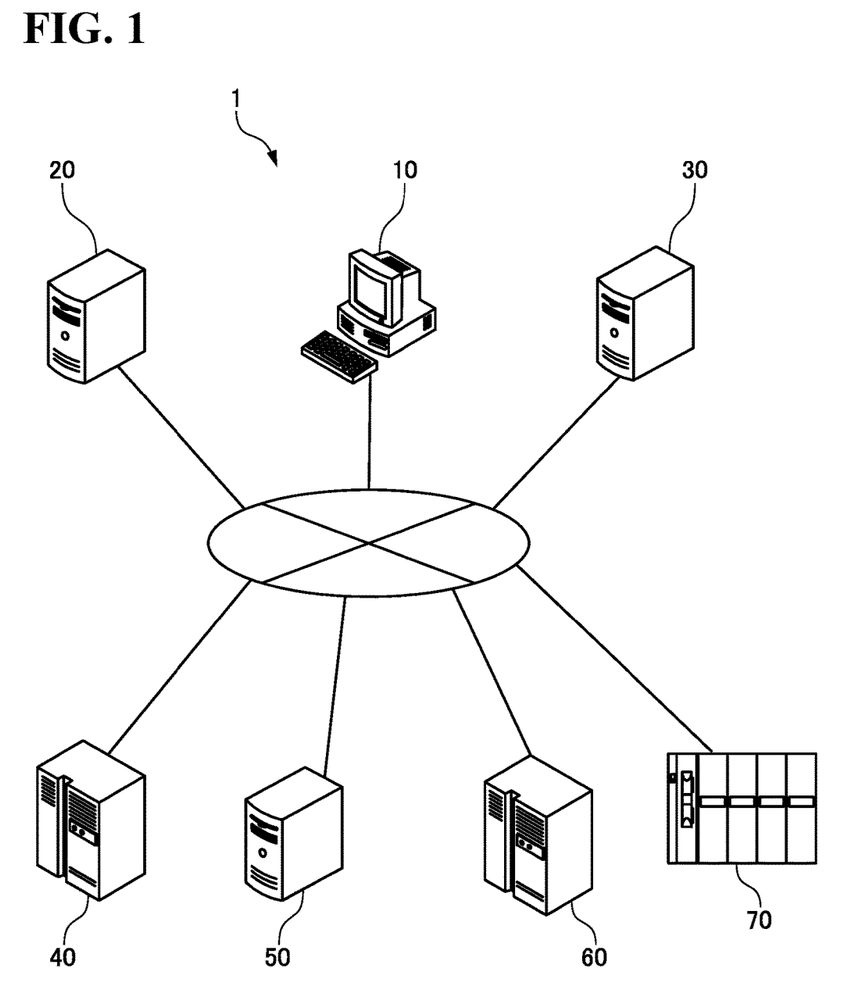
FIG. 1 is a diagram showing a configuration of an (AV) material file management system according to a first embodiment of the present invention.

FIG. 1 is a diagram showing a configuration of an (AV) material file management system 1 according to a first embodiment of the present invention. The (AV) material file management system 1 is created by extracting, from a media production system that handles material data as media files, portions related to generation, storage, retrieval, and use of material files.

In this case, a material file refers to stored data that is an entity at storage of a bitstream when playout of the material file is performed, and may be a media file storing a bitstream at playout having been compressed by a prescribed data compression scheme or may be a media file storing the bitstream at playout without modification. The present embodiment will be described using, as an example of a material file, a material file based on MXF (Material eXchange Format) that is a standard media file format satisfying required specifications peculiar to the media & entertainment (M&E) industry.

Specifically, the (AV) material file management system 1 includes a client terminal 10 that queries a presence or absence of a desired material file, obtains the material file, and the like in response to a user's operation during video editing or the like, a metadata storage device 20 that stores metadata and the like which are related to contents of a desired material file and which are used when retrieving the material file, and an UMID name server 30 that integrally manages identification data corresponding to each material file in the present system 1 and basic technical properties related to the material file.

The basic technical properties include feature information at file playout (bitstream use feature information) that is information indicating a feature of a bitstream when playout of a material file is performed, and file entity information (stored data entity information) indicating an entitative feature of a material file being an entity at storage of the bitstream at playout.

Feature information at file playout is information indicating features of a bitstream when playout of a material file is performed regardless of an entity of the material file, and examples thereof include a duration, display width and height, a frame rate, a frame aspect ratio, a pixel sample depth, a pixel layout, color subsampling, and the number of audio channels. In the present embodiment, "dur" (duration), "depth" (pixel sample depth), and "sample" (color subsampling ratio) will be mainly used.

File entity information is information indicating entitative features of a material file being an entity at storage of a bitstream at playout, and examples thereof include a data compression scheme, a file wrapper kind (file format), a file size, and a storage location of a material file. In the present embodiment, "url" (storage location of a material file), "codec" (data compression scheme), and "wrapper" (file wrapper kind) will be mainly used.

Furthermore, as shown in FIG. 1, the (AV) material file management system 1 includes an ingest server 40 which receives a video stream provided from the outside and generates a material file, a near-line material server 50 which temporarily stores material files considered necessary for video editing or the like, a playout server 60 which stores a material file for playout (for broadcast) and performs video playout, and an archive device 70 which stores material files for long-term storage.

The ingest server 40, the near-line material server 50, the playout server 60, and the archive device 70 have a commonality of storing material files and are so-called material servers.

Metadata which is related to contents and the like of a material file and which is contained in the metadata storage device 20 includes, in addition to a date/time and location of shooting of the video material file, information related to contents thereof such as a title and a summary. In particular, information related to contents also include combination information that combines, for example, with respect to a portion of specific photographed contents such as a homerun scene in a baseball video, text data indicating that the portion is a "homerun scene" with a timecode of frames (label information in a hh:mm:ss:ff format assigned to each frame of a material file).

In order to uniquely identify a bitstream when playout of a material file is performed, a UMID (Unique Material IDentifier) that is a standard unique material identifier in the media & entertainment (M&E) industry is assigned to all material files. Moreover, a UMID is defined as a mandatory item of an MXF file.

Figure 2:
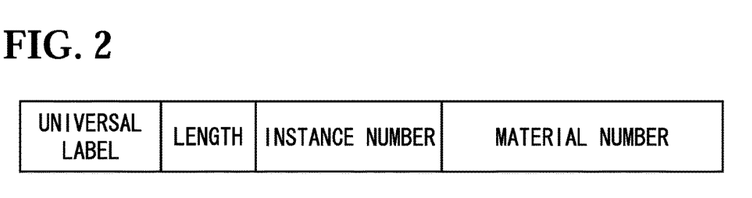
FIG. 2 is a diagram showing a format structure of a UMID (Unique Material Identifier).

FIG. 2 is a diagram showing a format structure of a UMID. The UMID is data constituted by four fields including a "universal label", a "length", an "instance number", and a "material number".

A "universal label" is identification information indicating that the present byte sequence is a UMID. In the "universal label", the top 10 bytes are fixed values while the 11th and 12th bytes are values dependent on a type of a material file identified by the UMID and on a generation method of the UMID.

A "length" indicates a total byte length of a field following this field and is a value fixed as 13h. An "instance number" is a field that distinguishes whether a material file identified by the UMID is an original material to be globally uniquely identified or a derived material that has been secondarily generated from an original material. In the former case, the "instance number" is zero, and in the latter case, the "instance number" is non-zero.

A "material number" is a 16-byte value, the global uniqueness of which is guaranteed. The "material number" makes the UMID a globally unique material identifier. The "material number" is constituted by, for example, a combination of the time of creation of the material file identified by the UMID and a MAC (Media Access Control) address of a media product having created the material file. The "material number" is not limited to the configuration described above and other configuration methods may be used as long as its global uniqueness is guaranteed.

Material files having a same bitstream at playout are assigned a same UMID. Therefore, if the bitstream at playout is the same, the same UMID is assigned to a plurality of material files even with respectively different data compression schemes.

On the other hand, when bitstreams at playout (for example, bitrates, the numbers of pixels, or aspect ratios) of material files differ, even if the data compression scheme is the same, a different UMID is assigned to each material file. In other words, strictly speaking, the UMID has a role of globally uniquely identifying a bitstream at playout regardless of data compression schemes and the like.

Figure 3:
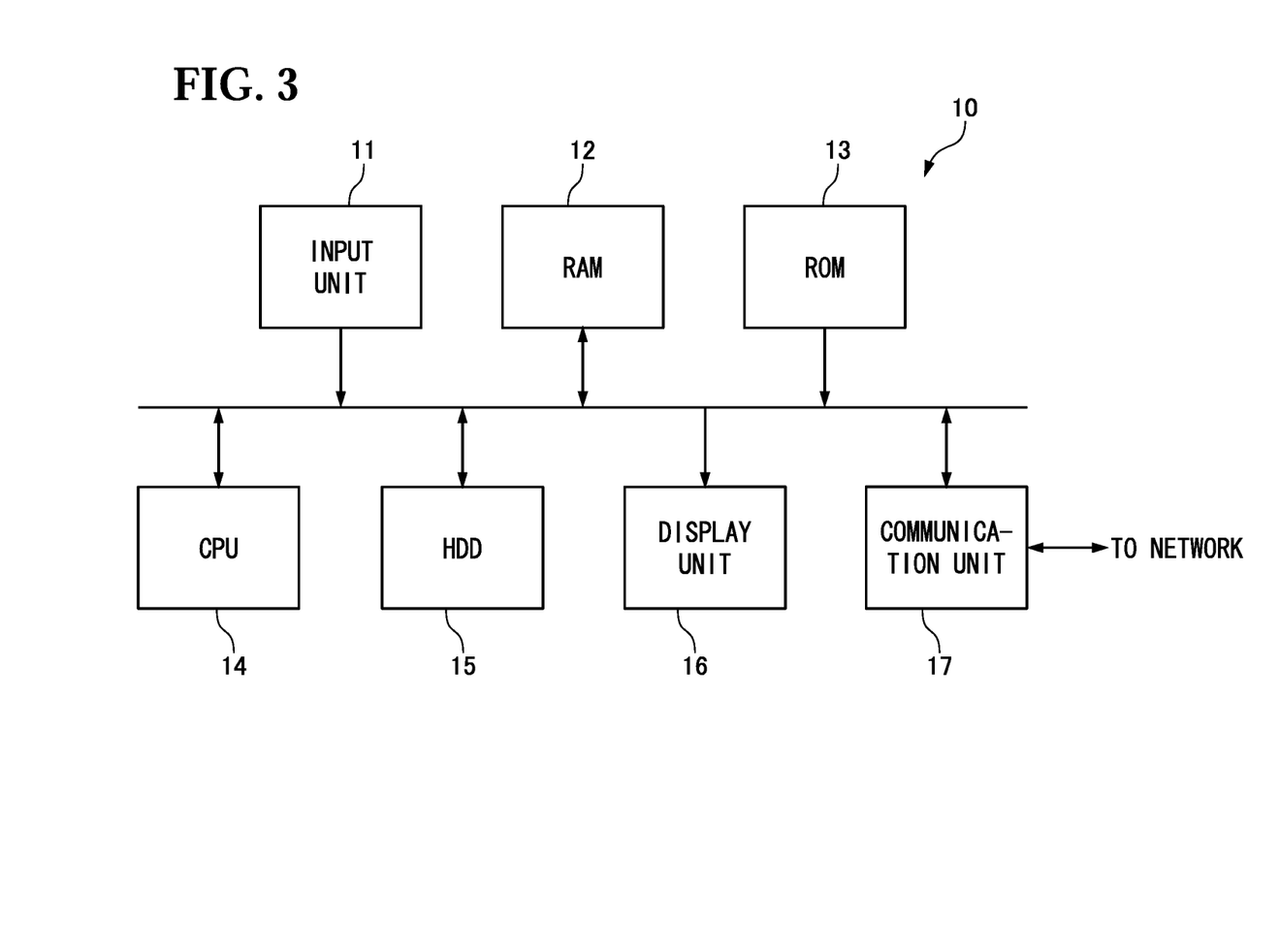
FIG. 3 is a block diagram showing a configuration of a client terminal.

FIG. 3 is a block diagram showing a configuration of the client terminal 10. The client terminal 10 includes an input unit 11 for inputting operation information of a user, a RAM 12 that temporarily stores data, a ROM 13 in which a computer program is stored in advance, a CPU 14 that executes all processes of the client terminal 10 according to the computer program, a hard disk drive (HDD) 15 that stores data, a display unit 16 that displays input or processed information to the user, and a communication unit 17 that transmits and receives data.

The input unit 11 is used to input operation information of a user. Examples of the input unit 11 include a keyboard and a pointing device. For example, the input unit 11 is used to input information for selecting and instructing desired information from information displayed on the display unit 16. The CPU 14 executes the respective steps shown in FIG. 5 (to be described later) according to a computer program stored in the ROM 13 or a computer program downloaded from a recording medium.

A screen in accordance with a processing status of the CPU 14 is displayed on the display unit 16. In addition, a screen for prompting the user to make a selection or issue an instruction is also displayed on the display unit 16. In this case, the user can select a desired item from those displayed on the display unit 16 by operating the input unit 11. The communication unit 17 is configured to be capable of communicating with the respective devices in the (AV) material file management system 1 and executes transmission and reception of data in accordance with an execution instruction by the CPU 14.

A prescribed application is installed in the client terminal 10. The client terminal 10 executes a process in accordance with an operation or an instruction by the user. For example, the client terminal 10 queries a material file necessary for obtaining a desired bitstream at playout to the UMID name server 30 and receives a response to the query from the UMID name server 30. In addition, when the client terminal 10 determines that the material file should actually be obtained based on the received response, the client terminal 10 accesses a storage location (URL) of the material file included in the response and obtains the material file.

The metadata storage device 20 stores metadata related to contents and the like of a desired material file to be used to retrieve the material file. The metadata is data including, for example, a UMID which is assigned to a material file and which globally uniquely identifies the material file, a text annotation (for example, a "homerun scene") related to the contents of the material, and positional information (time-code) of a frame with which the text annotation is associated in the material file identified by the UMID. Since each piece of metadata includes a UMID, the metadata is uniquely associated by the UMID with the material file identified by the UMID.

For example, even when material files are respectively stored in the ingest server 40, the near-line material server 50, the playout server 60, and the archive device 70, a same UMID is assigned to the material files if bitstreams at their playout are the same and different UMIDs are assigned to the material files if bitstreams at their playout are not the same.

The UMID name server 30 stores information related to all material files stored in the respective material servers of the (AV) material file management system 1. Specifically, the UMID name server 30 stores, with respect to all material files existing in the present system 1, the UMID of the material files and basic technical properties of the material files.

Figure 4:
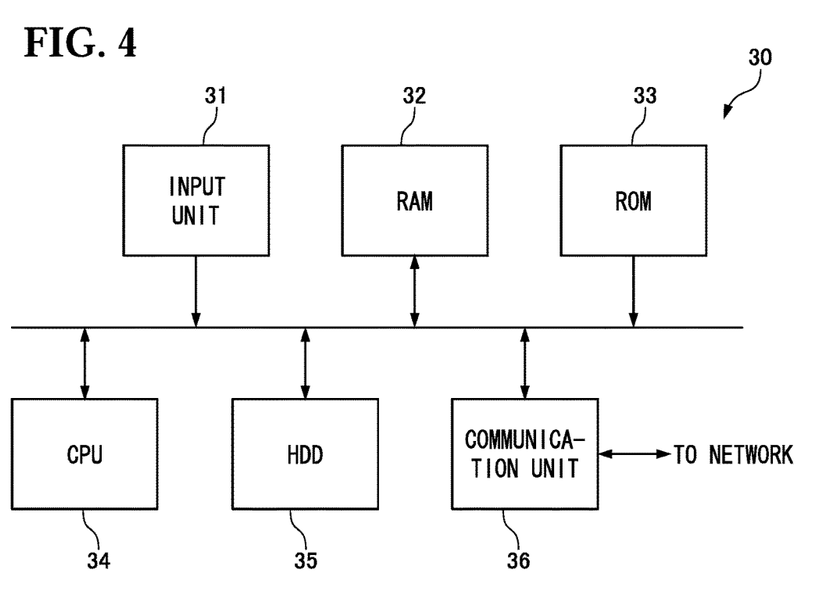
FIG. 4 is a block diagram showing a configuration of a UMID name server.

FIG. 4 is a block diagram showing a configuration of the UMID name server 30. The UMID name server 30 includes an input unit 31 for inputting operation information of a user, a RAM 32 that temporarily stores data, a ROM 33 in which a computer program is stored in advance, a CPU 34 that executes all processes of the UMID name server 30 according to the computer program, a HDD 35 that stores data, and a communication unit 36 that transmits and receives data.

In addition, the UMID name server 30 has the same functions as a so-called DNS (Domain Name System) name server. Accordingly, the UMID name server 30 enables new information to be registered using a dynamic DNS function and enables queries to be made using a DNS query function. Therefore, the HDD 35 stores information registered using the dynamic DNS function.

Upon receiving a query with respect to an arbitrary UMID from the client terminal 10 via the communication unit 36, the CPU 34 sends back basic technical properties including a URL corresponding to the UMID as a DNS response as a response to the client terminal 10.

When a material file corresponding to the queried UMID exists in plurality, although the material files share the same feature information at file playout, file entity information of the material files including URLs differs. Therefore, as a response to the client terminal 10, the CPU 34 separately transmits feature information at file playout that is information which indicates features of a bitstream at playout, and which is shared by the material files and file entity information indicating entitative features of each material file.

Accordingly, in addition to recognizing what kind of features the bitstream at playout uniquely identified by the queried UMID has at playout, the client terminal 10 can recognize where and in what state (data compression scheme, file format, or the like) each material file being an entity at storage of the bitstream at playout is stored.

Registration of Material File

In the (AV) material file management system 1 configured as described above, when a new video stream is generated by a video camera, the video stream is stored and registered as a material file as follows.

Let us assume that the entire (AV) material file management system 1 belongs to a domain named example.org. Upon receiving the video stream from the video camera, the ingest server 40 (ingSrv) generates a UMID (for example, "060A2B34☐0D20☐BFDF") for globally uniquely identifying a material file to be generated. In addition, the ingest server 40 stores the video stream as an MXF file "file5.mxf" (the material file) at a prescribed directory (/20130831/sports) with the UMID being assigned to the material file.

Upon detecting that the material file has been newly generated, the ingest server 40 registers the fact that the material file has been newly generated to the UMID name server 30. Specifically, the ingest server 40 sequentially registers a combination of the UMID assigned to the material file and feature information at file playout regarding the material file and a combination of the UMID and file entity information regarding the material file to the UMID name server 30 using the dynamic DNS function.

In this case, first, the ingest server 40 attaches a service type (_umid._udp) and a name of the domain (example.org) to which the ingest server belongs to the UMID excluding a fixed value portion thereof in order to convert the UMID into its domain-based representation (0D20☐BFDF._umid._udp.example.org). Furthermore, the ingest server 40 generates a text record associating the domain-based UMID with feature information at file playout corresponding to the UMID such as dur=60 (60 seconds), depth=10 (10 bit/pixel), sample=422 (YUV422), and the like, and registers the generated text record to the UMID name server 30 using the dynamic DNS function.

Next, the ingest server 40 generates a text record associating the domain-based UMID with file entity information corresponding to the UMID such as codec=j2k (JPEG2000), wrapper=mxf, and URL=http://ingSrv.example.org/20130831/sports/file5.mxf, and the like, and registers the generated text record to the UMID name server 30 using the dynamic DNS function.

Subsequently, the user of the ingest server 40 confirms contents of the material file of the ingest server 40 and prepares a result of the confirmation as metadata. For example, after confirming that the material file is a recording of a live coverage of a baseball game and includes a homerun scene, the user prepares a title and a summary of contents of the material file together with a location and a time of photography of the material file as metadata.

Furthermore, in addition to the title and the summary of contents of the material file, the user prepares a text annotation indicating a frame capturing the homerun scene paired with a timecode of the frame and the like as metadata. Subsequently, in accordance with an instruction by the user, the ingest server 40 associates the metadata with the UMID of the material file that is a description target of the metadata and registers the associated metadata to the metadata storage device 20.

On the other hand, when the material file "file5.mxf" is scheduled to be edited in the near future, the ingest server 40 further stores a material that is a complete copy of the material file under a file name "mat5.mxf" at a prescribed directory (/program1/materials) of the near-line material server 50 (matSrv), which also serves to back up the material file. This method can be implemented by, for example, a file copy (and subsequent renaming) operation between the material servers, FTP, and the like.

Upon detecting that the material file has been newly generated, the near-line material server 50 registers the fact that the material file has been newly generated to the UMID name server 30. Specifically, the near-line material server 50 sequentially registers a combination of the UMID assigned to the material file and feature information at file playout regarding the material file and a combination of the UMID and file entity information regarding the material file (including a URL of the material file) to the UMID name server 30 using the dynamic DNS function.

However, the material file (mat5.mxf) generated at this point is a material that is a complete copy of the original material file (file5.mxf) and bitstreams at playout completely match each other. Therefore, the UMID assigned to the material file (mat5.mxf) is the same as the UMID of the original material file (file5.mxf).

At this point, first, the near-line material server 50 converts the UMID into its domain-based representation (0D20□BFDF._umid._udp.example.org). Furthermore, the near-line material server 50 generates a text record associating the domain-based UMID with feature information at file playout corresponding to the UMID such as dur=60, depth=10, sample=422, and the like, and registers the generated text record to the UMID name server 30 using the dynamic DNS function. Since the material file is a material that is a complete copy, the feature information at file playout is exactly the same as that registered in the case of the ingest server 40.

Next, the near-line material server 50 generates a text record associating the domain-based UMID with file entity information corresponding to the UMID such as codec=j2k, wrapper=mxf, and URL=http://matSrv.example.org/program1/materials/mat5.mxf, and the like, and registers the generated text record to the UMID name server 30 using the dynamic DNS function. In this case, the material file is a material that is a complete copy of the original material file stored in the ingest server 40. However, since respective file names and material servers (including directories) which are storage destinations of the material files differ from each other, the respective pieces of file entity information only differ from each other in the URLs.

Moreover, even when a file name of a material file or a storage location of a material file is changed and, in turn, the URL of the material file is changed, the respective material servers (the ingest server 40, the near-line material server 50, the playout server 60, and the archive device 70) update information registered to the UMID name server 30 based on the changed values using the dynamic DNS function. In a similar manner, when a material file is deleted, the respective material servers delete registered information corresponding to the material file from the UMID name server 30 using the dynamic DNS function.

As a result, with respect to all material files stored by all material servers in the (AV) material file management system 1 (under the example.org domain), the UMID name server 30 is constantly aware of the latest state of basic technical properties of the material files including UMIDs and storage locations of the material files.

Obtaining and Retrieving a Material File

First, the client terminal 10 queries a desired material file (for example, a material file capturing a scene of a homerun by Ichiro) to the metadata storage device 20. As a response to the query, the client terminal 10 obtains a UMID that uniquely identifies a material file capturing a scene of Ichiro's homerun from the metadata storage device 20.

Next, using the obtained UMID as a key, the client terminal 10 searches for the material file identified by the UMID from various material files stored in the respective material servers of the present system 1. Specifically, the client terminal 10 executes processes of step S1 and subsequent steps described below.

Figure 5:
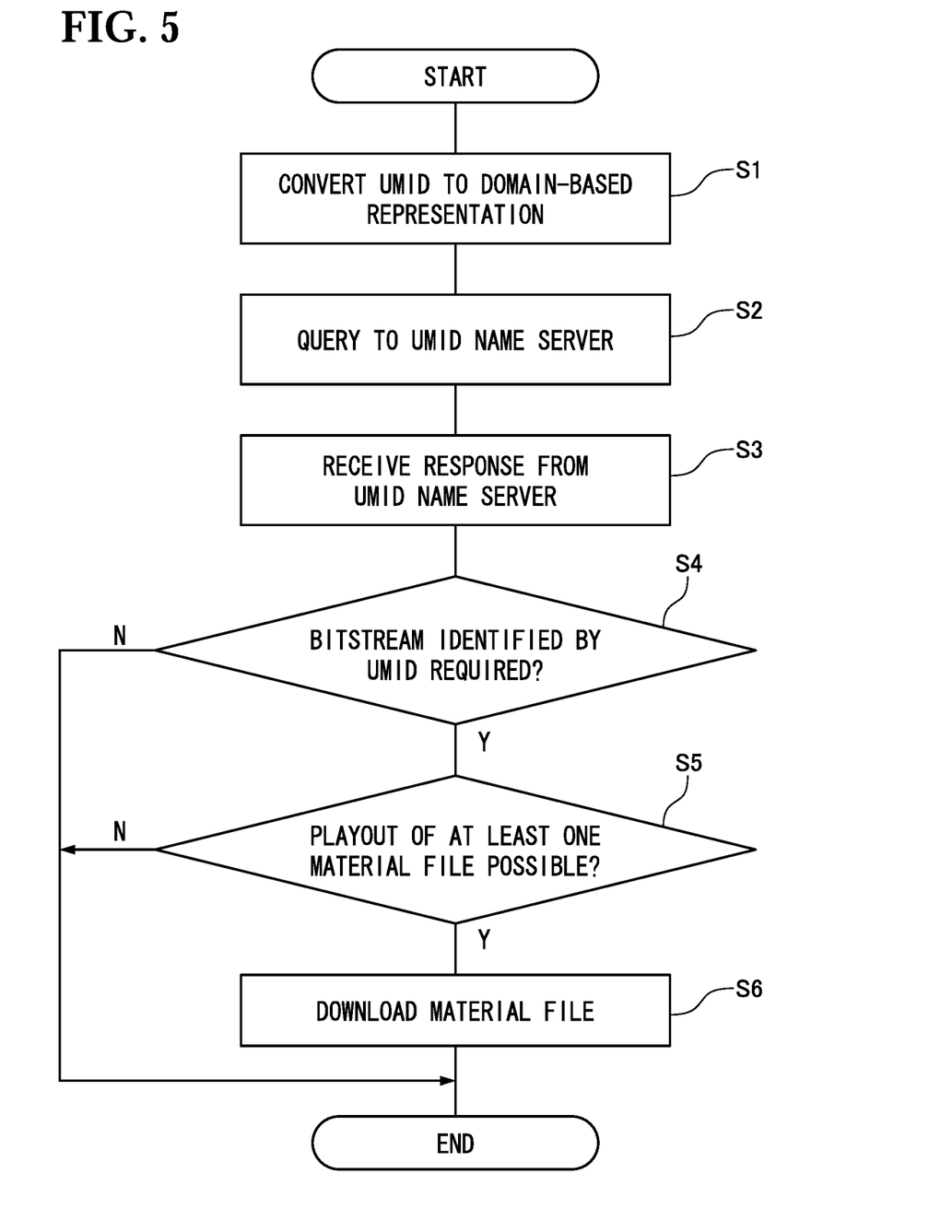
FIG. 5 is a flow chart showing a query processing routine by a client terminal.

FIG. 5 is a flow chart showing a query processing routine by the client terminal 10.

In step S1, the client terminal 10 converts a UMID into its domain-based representation. In this case, the client terminal 10 deletes a top fixed value from the UMID and adds (._umid._udp.example.org) to the end of the UMID. Here, (example.org) is the domain to which the present system 1 belongs.

In step S2, using the domain-based UMID converted in step S1, the client terminal 10 queries material files existing in the present system 1 to the UMID name server 30 using a DNS query function.

On the other hand, upon receiving the query from the client terminal 10, the UMID name server 30 transmits feature information at file playout and file entity information corresponding to the queried UMID to the client terminal 10 using a DNS response function as a response to the query.

In step S3, the client terminal 10 receives the feature information at file playout and the file entity information that are the response from the UMID name server 30 as a DNS response.

In step S4, the client terminal 10 refers to the feature information at file playout received as a DNS response from the UMID name server 30 and determines whether or not a bitstream at playout identified by the UMID is necessary.

For example, when a high-image quality bitstream at playout with depth=10 and sample=422 is required and the feature information at file playout indicates depth=8 or sample=420, the client terminal 10 determines that the bitstream at playout identified by the UMID is not necessary. On the other hand, when the feature information at file playout indicates depth=10 and sample=422, the client terminal 10 determines that the bitstream at playout identified by the UMID is necessary.

In addition, when the client terminal 10 determines that the bitstream at playout identified by the UMID is necessary, the process proceeds to step S5, and when the client terminal 10 determines that the bitstream at playout identified by the UMID is not necessary, the process is terminated.

In step S5, the client terminal 10 refers to all file entity information received as a DNS response from the UMID name server 30 and determines whether or not playout can be performed with respect to at least one of all material files being an entity at storage of the bitstream at playout identified by the UMID.

For example, when playout can only be performed on a material file with codec=j2k and wrapper=mxf and the received file entity information satisfies the conditions of codec=j2k and wrapper=mxf, the client terminal 10 determines "playout possible" with respect to the material file corresponding to the file entity information. On the other hand, when the conditions described above are not satisfied, the client terminal 10 determines "playout not possible" with respect to the material file corresponding to the file entity information.

In addition, when the client terminal 10 determines that playout can be performed with respect to at least one material file, the process proceeds to step S6, and when client terminal 10 determines that there are no material files of which playout can be performed, the process is terminated.

In step S6, with respect to the material file of which playout is determined to be possible, the client terminal 10 refers to the URL included in the file entity information corresponding to the material file and downloads the material file from its storage destination.

In addition, when the client terminal 10 determines in step S5 that playout of a plurality of material files can be performed, the client terminal 10 displays file entity information corresponding to the material files of which playout is possible on the display unit 16 (refer to FIG. 3) and stands by until an instruction is issued by the user.

The client terminal 10 refers to a URL of file entity information instructed by the user via the input unit 11 among the pieces of file entity information displayed on the display unit 16, and downloads the material file from the material server.

As described above, in the (AV) material file management system 1 according to the first embodiment, when one or more material files each being an entity at storage of a bitstream at playout that is uniquely identified by a UMID are respectively stored at different locations, the client terminal 10 queries material files at storage of the bitstream at playout that is uniquely identified by the UMID to the UMID name server 30 and receives feature information at file playout and file entity information from the UMID name server 30. Accordingly, based on the feature information at file playout and the file entity information, the client terminal 10 can find a bitstream at playout required by the client terminal 10 and a material file that enables playout of the bitstream at playout to be actually performed.

In addition, in the (AV) material file management system 1, when retrieved material files exist in plurality as described earlier, the client terminal 10 presents file entity information corresponding to each of the plurality of material files to the user and downloads only a material file corresponding to file entity information instructed by the user. As a result, the user can obtain only a desired material file.

Modification of First Embodiment

While the (AV) material file management system 1 includes one UMID name server 30 in the present embodiment, a plurality of UMID name servers 30 may be provided in order to attain load distribution.

In addition, by establishing rules with respect to conditions of a material file required by the client terminal 10, the client terminal 10 may automatically determine whether or not a material file is necessary by collating the rules with detailed parameters of feature information at file playout. For example, when editing a high-image quality video with depth=10 and sample=422 as conditions of the required material file, the client terminal 10 may automatically select material files with values of depth=10 and sample=422 for the feature information at file playout.

In step S4 described above, the client terminal 10 requires a high-image quality bitstream at playout with depth=10 and sample=422. However, when a bitstream at playout satisfying such conditions does not exist, the client terminal 10 may determine a bitstream at playout with a lower quality than required by the conditions to be necessary. For example, when only a bitstream at playout with feature information at file playout including depth=8 (8 bit/pixel) and sample=420 (YUV420) exists, the client terminal 10 may determine that the bitstream at playout is necessary.

In addition, in step S4 described above, when the client terminal 10 requires a bitstream at playout satisfying prescribed quality conditions but a bitstream at playout satisfying the prescribed quality conditions does not exist, the client terminal 10 may determine a bitstream at playout with a higher quality than the quality conditions to be necessary.

For example, when a bitstream at playout with depth=8 and sample=420 is required, but a bitstream at playout satisfying the quality conditions does not exist and only a bitstream at playout with feature information at file playout with depth=10 and sample=422 exists, the client terminal 10 may determine that the bitstream at playout is necessary. In this case, the client terminal 10 may obtain a bitstream at playout with depth=10 and sample=422 and convert the bitstream at playout into a bitstream with depth=8 and sample=420.

When there are a plurality of material files which the client terminal 10 requires and of which playout can be performed, the client terminal 10 may automatically select a material file matching detailed parameters (codec, wrapper, and the like) with a highest priority among detailed parameters of file entity information, access a storage location of the material file, and automatically download the material file. For example, when the client terminal 10 supports both MPEG and JPEG2000 as data compression schemes but favors the latter from the perspective of processing capability, only material files with values of codec=j2k may be automatically selected.

The UMID name server 30 is arranged under a prescribed domain (in the present embodiment, example.org). Therefore, the user can access the UMID name server 30 using a normal DNS domain resolution function from anywhere in the world. In other words, unless restrictions based on security technology such as a firewall are imposed, the user can acquire any material under a prescribed domain via the Internet from anywhere in the world.

Moreover, the present embodiment is premised on the UMID name server 30 being arranged directly under the example.org domain and being shared with a DNS name server of example.org. Alternatively, a subdomain named _umid._udp may be set under the domain and management of correspondence between the UMID and basic technical properties may be transferred to the subdomain. In other words, a UMID name server dedicated to UMID resolution may be separately prepared under a _umid._udp.example.org domain. Accordingly, a DNS in charge of network infrastructure and management of material data based on UMIDs can be completely separated and mutual effects between the two can be minimized.

Alternatively, the (AV) material file management system 1 may set subdomains (for example, news.example.org and sports.example.org) under a prescribed domain and provide the UMID name server 30 in each subdomain. Accordingly, the (AV) material file management system 1 can perform material file management within a range better conforming to specific production sites and, at the same time, even material files existing over a plurality of subdomains can be readily managed using the DNS domain resolution function.

When a query is received from the client terminal 10, the UMID name server 30 may sequentially transmit feature information at file playout and file entity information in an arbitrary order instead of collectively transmitting feature information at file playout and file entity information.

The client terminal 10 may execute the respective steps by switching the orders of steps S4 and S5 shown in FIG. 5.

Moreover, while the UMID name server 30 and the metadata storage device 20 are independently set in the present embodiment, the UMID name server 30 and the metadata storage device 20 may be integrated instead. In this case, in response to a query for a desired material file (for example, a query for a material file capturing a scene of a homerun by Ichiro) based on contents from the client terminal 10, the metadata storage device 20 (including the UMID name server 30) directly transmits feature information at file playout and file entity information of the material file corresponding to the query to the client terminal 10. Accordingly, the client terminal 10 can directly obtain a material file for performing playout of a desired bitstream at playout without having to handle a UMID.

While the UMID name server 30 is realized using the DNS function in the present embodiment, the UMID name server 30 is not limited thereto. In other words, the UMID name server 30 need only be a database to which a UMID and feature information at file playout, and a UMID and file entity information, can be respectively registered in correspondence to each other, and which can transmit feature information at file playout and file entity information corresponding to a UMID in response to a query specifying the UMID. As such, the DNS function itself is not essential.

Second Embodiment

Figure 6:
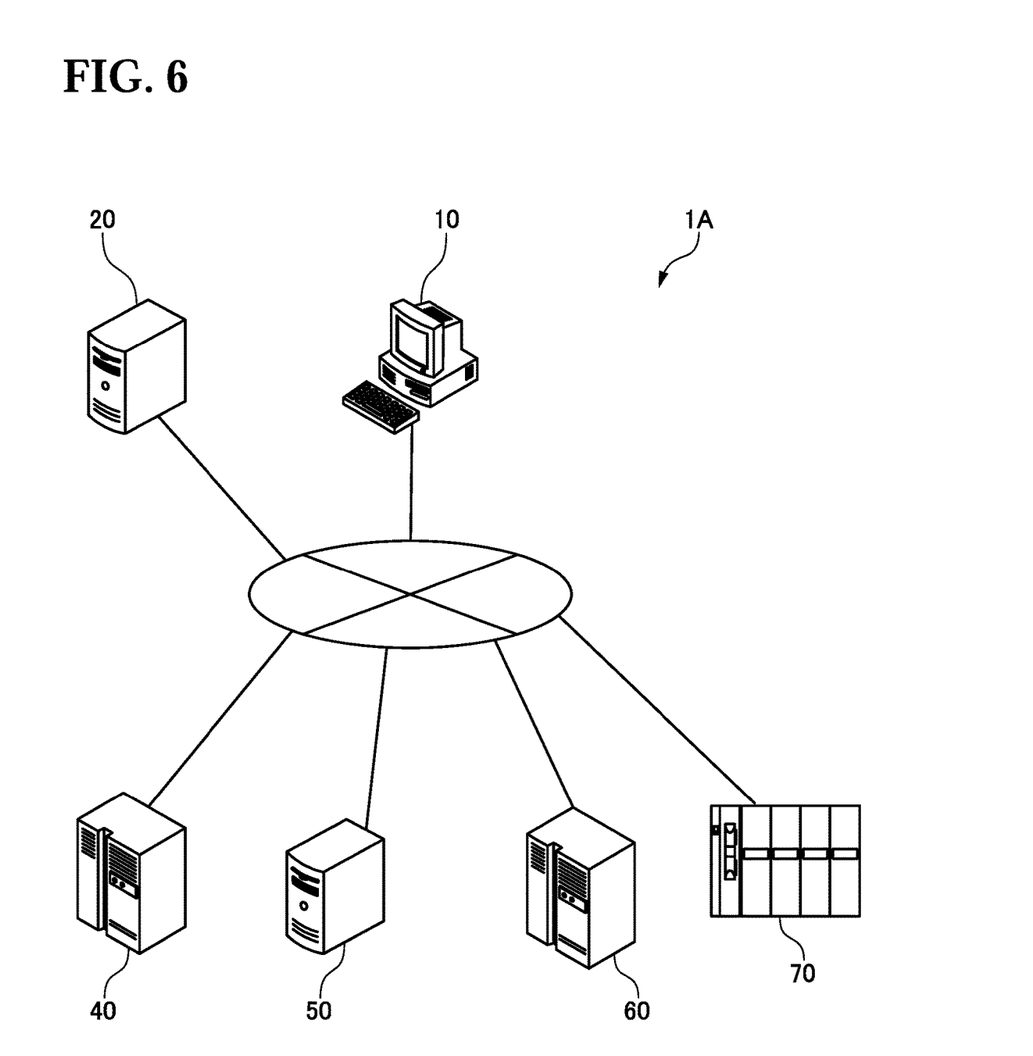
FIG. 6 is a diagram showing a configuration of an (AV) material file management system according to a second embodiment of the present invention.

FIG. 6 is a diagram showing a configuration of an (AV) material file management system 1A according to a second embodiment. It should be noted that same components as those described in the first embodiment will be denoted by the same reference numerals and, as such, differences from the first embodiment will be mainly described.

The (AV) material file management system 1A is constituted by a logically-closed local network such as a network inside a broadcasting station and, unlike in the first embodiment (FIG. 1), does not include the UMID name server 30. Instead, each material server (the ingest server 40, the near-line material server 50, the playout server 60, and the archive device 70) internally incorporates a function comparable to the UMID name server 30.

For example, the ingest server 40 has a storage area for registering basic technical properties related to material files owned by the ingest server 40. When the ingest server 40 internally detects that a material file has been newly generated, the ingest server 40 generates a new UMID and assigns the UMID to the material file, and subsequently stores a combination of the UMID and feature information at file playout related to the material file and a combination of the UMID and file entity information related to the material file in the storage area described above. Moreover, information stored in the storage area may be at least comparable to the information stored in the first embodiment or, alternatively, new information considered necessary for realizing functions specific to the ingest server 40 may be added.

When there is a query for a prescribed UMID using the DNS query function from the client terminal 10, the ingest server 40 responds as follows. When the ingest server 40 stores the feature information at file playout and the file entity information corresponding to the UMID, the ingest server 40 transmits the feature information at file playout and the file entity information to the client terminal 10 using the DNS response function. When the ingest server 40 does not store the feature information at file playout and the file entity information corresponding to the UMID, the ingest server 40 transmits the fact that the information is not stored to the client terminal 10 using the DNS response function.

Figure 7:
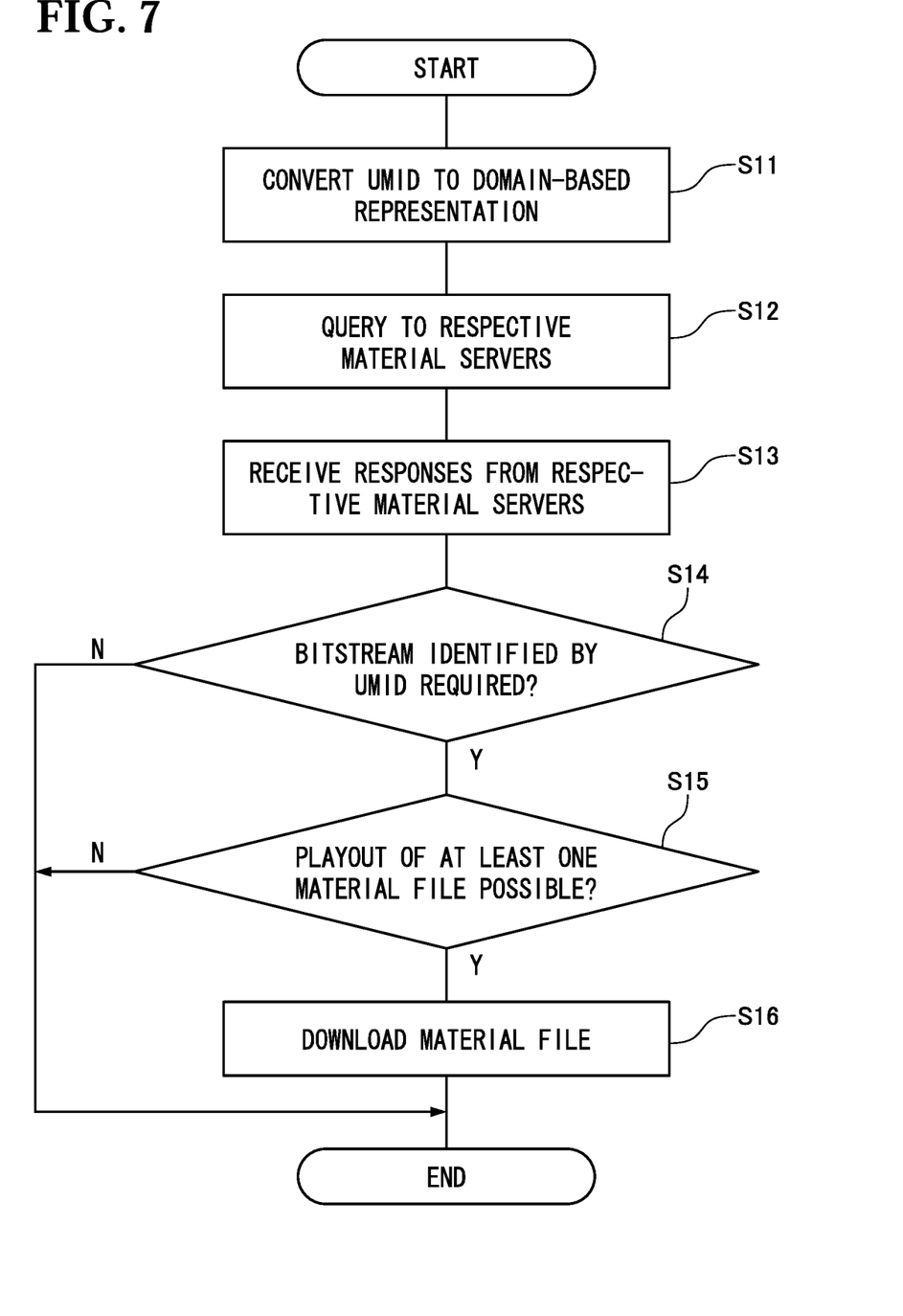
FIG. 7 is a flow chart showing a query processing routine by a client terminal.

FIG. 7 is a flow chart showing a query processing routine by the client terminal 10. In step S11, the client terminal 10 converts a UMID into its domain-based representation in a similar manner to the first embodiment.

In step S12, with respect to each material server in the (AV) material file management system 1A, using the domain-based UMID converted in step S11, the client terminal 10 queries material files existing in the present system 1A using the DNS query function.

At this point, the client terminal 10 may successively perform one-to-one correspondence with each material server using a DNS query function based on ordinary DNS or may simultaneously transmit DNS queries to all material servers using a DNS query function based on multicast DNS.

On the other hand, upon receiving the query using the DNS query function from the client terminal 10 described above, each material server transmits feature information at file playout and file entity information corresponding to the queried UMID to the client terminal 10 using the DNS response function as a response to the query. In addition, when the feature information at file playout and file entity information corresponding to the queried UMID are not stored, each material server transmits the fact that the information is not stored to the client terminal 10 using the DNS response function.

In step S13, the client terminal 10 receives a response (the feature information at file playout and the file entity information or the fact that the information is absent) from each material server as a DNS response.

In step S14, the client terminal 10 refers to the feature information at file playout received in step S13 and determines whether or not each material file being an entity at storage of the bitstream at playout identified by the UMID is necessary. A method of determining whether or not a material file is necessary is similar to that in the first embodiment.

At this point, unlike in the first embodiment, the client terminal 10 receives the feature information at file playout from each material server. Since feature information at file playout and a UMID are in a one-to-one correspondence, the feature information at file playout received by the client terminal 10 from all material servers is the same. Therefore, the client terminal 10 may execute the present step upon receiving the first piece of feature information at file playout.

In addition, when the client terminal 10 determines that each material file being an entity at storage of the bitstream at playout identified by the UMID is necessary, the process proceeds to step S15, and when the client terminal 10 determines that each material file being an entity at storage of the bitstream at playout identified by the UMID is not necessary, the process is terminated.

In step S15, the client terminal 10 refers to all file entity information received as a DNS response from each material server and determines whether or not playout can be performed with respect to at least one of all material files being an entity at storage of the bitstream at playout identified by the UMID. A method of determining whether or not playout can be performed is similar to that in the first embodiment.

When the client terminal 10 determines that playout can be performed with respect to at least one material file, the process proceeds to step S16, and when client terminal 10 determines that there are no material files of which playout can be performed, the process is terminated.

In step S16, with respect to the material file for which playout is determined to be possible, the client terminal 10 refers to the URL included in the file entity information corresponding to the material file and downloads the material file from its storage destination.

In addition, when the client terminal 10 determines in step S15 that playout of a plurality of material files can be performed, the client terminal 10 displays file entity information corresponding to the material files of which playout is possible on the display unit 16 (refer to FIG. 3) and stands by until an instruction is issued by the user.

The client terminal 10 refers to a URL of file entity information instructed by the user via the input unit 11 among the pieces of file entity information displayed on the display unit 16 and downloads the material file from the material server.

As described above, when the (AV) material file management system 1A according to the second embodiment is in a local network, the client terminal 10 queries material files being an entity at storage of the bitstream at playout uniquely identified by the UMID to all material servers in the present system and directly receives feature information at file playout and file entity information from the material servers. Accordingly, based on the feature information at file playout and the file entity information, the client terminal 10 can find a bitstream at playout required by the client terminal 10 and a material file that enables playout of the bitstream at playout to be actually performed.

Modification of Second Embodiment

When successively querying each material server using ordinary DNS query, the client terminal 10 may terminate subsequent processes upon obtaining a desired material file.

Moreover, when the client terminal 10 simultaneously queries all material servers using multicast DNS, a material server not having the material file may or may not transmit a response to the effect that the material file is absent to the client terminal 10. In the case of the latter, for example, when no response is received within a prescribed period of time after making the query, the client terminal 10 determines that the desired material file does not exist in the (AV) material file management system 1A.

On the other hand, when the desired material file exists in plurality in the (AV) material file management system 1A, the client terminal 10 intermittently receives responses from the respective material servers as DNS responses. In this case, the client terminal 10 may sequentially examine the responses from the respective material servers and, once the desired material file is obtained, the client terminal 10 may ignore subsequently received responses.

In addition, the (AV) material file management system 1A according to the present embodiment may include a proxy UMID name server that collectively manages material files owned by a plurality of material servers, and each material server may be configured to successively report a management status of material files in the material server to the proxy UMID name server. Accordingly, in terms of responding to the client terminal 10, the proxy UMID name server can function as a large material server that consolidates a plurality of material servers.

While the first and second embodiments have been discussed above based on a bitstream at playout that is identified by a UMID and a material file being an entity at storage of the bitstream at playout, the present invention is not limited thereto.

For example, the present invention can also be applied to ordinary document files instead of material files. For example, when document data such as Word and Excel files are stored as data compressed based on a data compression scheme such as ZIP or LZH, the discussion presented above can be applied without modification by introducing an ID that uniquely identifies a digital asset that is document data in an original, uncompressed state. In this case, a UUID (Universally Unique Identifier), a URN (Unique Resource Name), or the like can be used as an ID that uniquely identifies document data.

REFERENCE SIGNS LIST 1 (AV) material file management system
10 Client terminal
11 Input unit
14 CPU
16 Display unit
17 Communication unit
30 UMID name server
40 Ingest server
50 Near-line material server
60 Playout server
70 Archive device That which is claimed:

1. A terminal device, comprising at least one processor and at least one non-volatile computer readable medium including computer program code, the at least one non-volatile computer readable medium and the computer program code configured to, with the processor, cause the terminal device to at least:

transmit, to a server device, when one or more pieces of stored data each being an entity of a unique bitstream are respectively stored in different modes in one or more data storage devices, identification data for identifying all of the pieces of stored data capable of restoring the unique bitstream;

receive, from the server device, bitstream use feature information indicating a feature during use of the unique bitstream indicated by the identification data, and stored data entity information indicating an entitative feature of each of the one or more pieces of stored data capable of restoring the unique bitstream indicated by the identification data;

determine, when the bitstream use feature information includes quality information during use of the unique bitstream, the stored data entity information includes data compression scheme information of the unique bitstream, and the quality information is not within a prescribed range, that none of the pieces of stored data identified by the identification data is to be acquired; and determine, when the quality information is within the prescribed range and the data compression scheme information matches at least one piece of prescribed data compression scheme information, that at least one piece of stored data corresponding to the stored data entity information including the matching prescribed data compression scheme information is to be acquired from the one or more data storage devices.

2. The terminal device according to claim 1, wherein the at least one non-volatile computer readable medium and the computer program code are further configured to, with the processor, cause the terminal device to:

acquire the at least one piece of stored data from the one or more data storage devices.

3. The terminal device according to claim 2, wherein the at least one non-volatile computer readable medium and the computer program code are further configured to, with the processor, cause the terminal device to:

present, when the quality information included in the bitstream use feature information is within the prescribed range and the data compression scheme information included in the stored data entity information matches at least one piece of the prescribed data compression scheme information, one or more pieces of the stored data entity information including the matching prescribed data compression scheme information to a user device; and determine that a piece of stored data corresponding to the stored data entity information selected by the user device among the one or more pieces of the stored data entity information is to be acquired from a corresponding data storage device.

4. The terminal device according to claim 2, wherein the at least one non-volatile computer readable medium and the computer program code are further configured to, with the processor, cause the terminal device to:

acquire a piece of stored data based on storage location information included in corresponding stored data entity information.

5. The terminal device according to claim 1, wherein the one or more data storage devices comprise the server device.

6. A computer program product comprising a non-transitory computer readable medium having computer program instructions stored therein, the computer program instructions are configured to, when executed by a processor, cause the processor to:

transmit, to a server device, when one or more pieces of stored data each being an entity of a unique bitstream are respectively stored in different modes in one or more data storage devices, identification data for identifying all of the pieces of stored data capable of restoring the unique bitstream;

receive, from the server device, bitstream use feature information indicating a feature during use of the unique bitstream indicated by the identification data, and stored data entity information indicating an entitative feature of each of the one or more pieces of stored data capable of restoring the unique bitstream indicated by the identification data;

determine, when the bitstream use feature information includes quality information during use of the unique bitstream, the stored data entity information includes data compression scheme information of the unique bitstream, and the quality information is not within a prescribed range, that none of the pieces of stored data identified by the identification data is to be acquired; and determine, when the quality information is within the prescribed range and the data compression scheme information matches at least one piece of prescribed data compression scheme information, that at least one piece of stored data corresponding to the stored data entity information including the matching prescribed data compression scheme information is to be acquired from the one or more data storage devices.

7. A server device, comprising at least one processor and at least one non-volatile computer readable medium including computer program code, the at least one non-volatile computer readable medium and the computer program code configured to, with the processor, cause the server device to at least:

store, when one or more pieces of stored data, each of which is capable of restoring a unique bitstream during use even when stored in different mode, are stored in one or more data storage devices, identification data for globally uniquely identifying the unique bitstream during use, bitstream use feature information which indicates a feature during use of the unique bitstream globally uniquely identified by the identification data and which comprises quality information during use of the unique bitstream, and stored data entity information which indicates an entitative feature of each piece of the one or more pieces of stored data capable of restoring the unique bitstream globally uniquely identified by the identification data and which comprises data compression scheme information of the piece of the stored data;

receive the identification data transmitted from a terminal device;

determine the bitstream use feature information and the stored data entity information corresponding to each piece of the one or more pieces of stored data, both of which are associated with the identification data received from the terminal device; and transmit the bitstream use feature information and the one or more stored data entity information to the terminal device.

8. The server device according to claim 7, wherein the at least one non-volatile computer readable medium and the computer program code are further configured to, with the processor, cause the server device to:

store the one or more pieces of stored data in a stored data storage unit comprising the one or more data storage devices.

* * * * *